Figure 1:
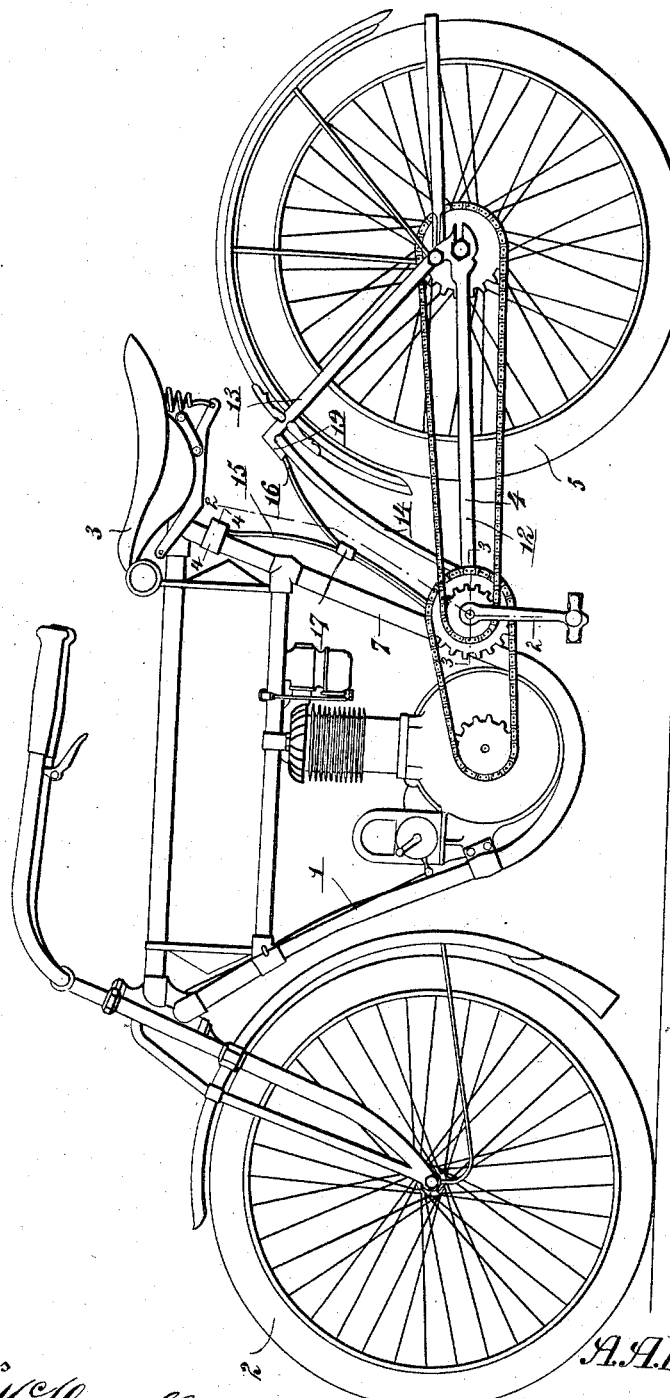

A. A. BAMFORD.
RESILIENT CYCLE FRAME.
APPLICATION FILED MAY 7, 1912.

1,064,697.

Patented June 17, 1913.
2 SHEETS—SHEET 1.

A. A. BAMFORD.
RESILIENT CYCLE FRAME.
APPLICATION FILED MAY 7, 1912.
1,064,697.
Patented June 17, 1913.
2 SHEETS—SHEET 2.
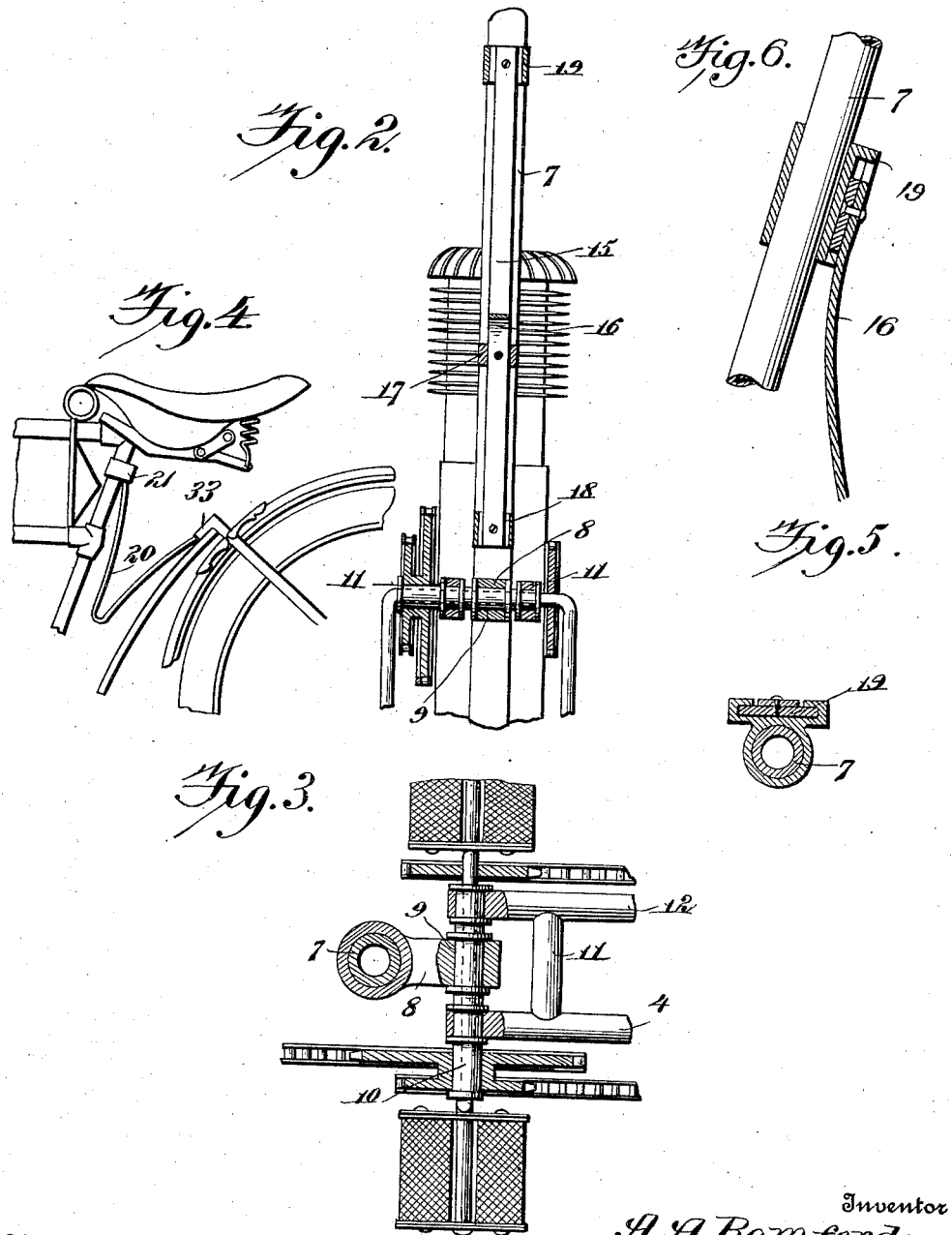
Witnesses
W. S. McDowell
C. C. Hines
Inventor
A. A. Bamford
By Victor J. Evans
Attorney

UNITED STATES PATENT OFFICE.

ARTHUR A. BAMFORD, OF CHICAGO, ILLINOIS.

RESILIENT CYCLE-FRAME.

1,064,697.  Specification of Letters Patent.  Patented June 17, 1913.

Application filed May 7, 1912. Serial No. 695,666.

*To all whom it may concern:*

Be it known that I, ARTHUR A. BAMFORD, a citizen of the United States, residing at Chicago, in the county of Cook and State of Illinois, have invented new and useful Improvements in Resilient Cycle-Frames, of which the following is a specification.

This invention relates to improvements in the frame construction of bicycles and motorcycles, the object of the invention being to provide a resilient frame which will effectually take up and absorb all shocks and jars and prevent transmission of the same to the supporting seat, and also to provide a frame structure which is absolutely rigid for steering action, and adapted to withstand all the strains imposed thereon.

A further object of the invention is to provide a frame structure of the character described, in which the rear portion of the frame, carrying the driving wheel, is hingedly connected with the main portion of the frame, and wherein a novel construction and arrangement of springs is provided between the frame elements, so as to permit the parts to have relatively yielding motion, to secure a desirable cushioning action.

The invention consists of the features of construction, combination and arrangement of parts, hereinafter fully described and claimed, reference being had to the accompanying drawing, in which:—

Figure 1 is a side elevation, showing the application of the invention to one type of motorcycle frame. Fig. 2 is a vertical transverse section on the line 2—2 of Fig. 1. Fig. 3 is a horizontal transverse section on the line 3—3 of Fig. 1. Fig. 4 is a side elevation illustrating a modified construction. Fig. 5 is a detail horizontal transverse section showing the connection between one of the arms of the spring and one of the frame sections. Fig. 6 is a vertical longitudinal section of the same.

In the accompanying drawing, I have shown the application of my invention to a motorcycle of the chain driven type, including a counter shaft driven by a chain from the motor shaft, and operating in turn through a connecting chain to transmit motion to the rear drive wheel.

In carrying my invention into practice, I provide a main frame section 1, which supports the driving motor, the front or steering wheel 2, and the seat or saddle 3, and a rear frame section 4, carrying the rear or driving wheel 5, which may be driven from the motor shaft by any suitable type of drive gearing. The rear upright tube 7 of the main frame section 1 is provided with a bracket lug 8, carrying a bushing 9, in which is journaled the counter shaft 10 of the drive gearing, and to which bushing is pivotally connected the crown portion 11 connecting the forward ends of the rear forked tubes of the rear frame section 4, whereby relative vertical motion between the two frame sections is permitted. The said rear frame section 4 includes upwardly converging tubes 13 which are suitably connected at their upper ends, and which are connected with the forward ends of the forked tubes 12 by a brace 14, whereby a strong and durable frame structure is provided. Disposed between the frame structures 1 and 4 is a cushioning spring, comprising two leaf spring sections 15 and 16 which are firmly united at a point between their upper and lower ends by a clip or other suitable connection 17. The lower ends of these springs are fastened to the rear tube 7 of the main frame section by a clip 18 or other suitable coupling, by which a rigid connection of the lower ends of both springs with the main frame section is obtained. The upper ends of the leaf springs are divided or separated, and diverge forwardly and rearwardly, and are yieldingly connected at their extremities with the upper rear portion of the front frame section, and upper front portion of the rear frame section, respectively. The connections shown are in the form of keeper sockets 19, in which the ends of the springs are slidably fitted, or any other suitable type of fastening means which will permit the free ends of the springs to have relative motion toward and from each other, and a movable connection between them and the frame structures, whereby the springs are adapted to compensate for variations in the distances between their points of attachment 17 and their points of connection with the upper portions of the frame sections in the relative vertical movements of said frame sections.

In Fig. 4 of the drawings I have shown a modified construction of spring connection between the frame sections, and which is designed more particularly for use upon light motorcycles and bicycles. In this construction a substantially V-shaped or U-shaped spring 20 is employed which is arranged between the adjacent upper portions of the frame sections with the free ends of its arms projecting upwardly and rigidly connected with brackets or clips 21, and 33, suitably formed upon or secured to the upper rear portion of the main frame section and the upper front portion of the rear wheel frame section. This construction and arrangement of the cushioning spring will be found serviceable and efficient in application to light motorcycles and bicycles.

It will be seen from the foregoing description that the cushioning spring adapts the two frame sections to have easy relative vertical play in passing over rough and irregular roads and surfaces, and that such motion of the frame sections is limited by the cushioning springs which also take up and absorb all shocks and jars, and prevent the same from being transmitted to the main frame, enabling an easy riding motion to be obtained. It will also be seen that the springs connect the frame sections, so as to secure proper rigidity for steering motion, and to adapt the frame as a whole to withstand all of the running strains imposed thereon.

While the structure shown is preferred, it is to be understood that it may be varied as conditions demand in the application of the invention to different types of bicycles and motorcycles, and that modifications may, therefore, be made within the spirit of the invention, as defined in the appended claims, without departing from or sacrificing any of the advantages of the invention.

I claim:—

1. A vehicle of the character described including pivotally connected frames, and a leaf spring coupled to said frames, said spring being slidably connected with at least one of said frames.

2. A vehicle of the character described, including a front frame section carrying a supporting and steering wheel, a rear frame section carrying a supporting and driving wheel, said frame sections being pivotally connected, and a leaf spring fixed at its lower end to the lower rear portion of the main frame section and having divisions respectively connected with the upper rear portion of said main frame section and the upper front portion of the rear frame section above the pivotal connection.

3. A vehicle of the character described, including a front frame section carrying a supporting and steering wheel, a rear frame section carrying a supporting and driving wheel, said frame sections being pivotally connected for relative vertical motion, and a leaf spring comprising two spring sections secured at their lower ends to each other and to the main frame section, and having their upper ends free from connection with each other and respectively connected with said frame section.

4. A vehicle of the character described, including a front frame section carrying a supporting and steering wheel, a rear frame section carrying a supporting and driving wheel, a pivotal connection between the lower front portion of the rear frame section and the lower rear portion of the main frame section to adapt said sections to have relative vertical movement, and a leaf spring secured at its lower end to the rear portion of the main frame section and having diverging divisions respectively connected with the upper rear portion of the main frame section and the upper front portion of the rear frame section.

5. A vehicle of the character described, including a front frame section provided with a supporting and steering wheel, a rear frame section provided with a supporting and driving wheel, said sections being pivotally connected for relative vertical movement, and a leaf spring fixed at its lower end to the main frame section and having divisions connected at their free ends to the respective frame sections.

6. A vehicle of the character described including pivotally connected frame sections, and a leaf spring interposed between said sections and terminally connected with the rear upright of the front section and the front upright of the rear section, said spring being slidably coupled to at least one of said sections.

7. A vehicle of the character described including pivotally connected frame sections, and a spring having diverging arms respectively connected with said frame sections, and slidably coupled to at least one of them.

8. A vehicle of the character described including pivotally connected frame sections, and a substantially V-shaped spring interposed between and having its arms respectively connected with said frame sections, and slidably connected with at least one of them.

9. A vehicle of the character described including pivotally connected front and rear frame sections, brackets upon the rear upright of the front section and front upright of the rear section, and a leaf spring terminally engaging said brackets and slidably connected with at least one of them.

10. A vehicle of the character described including front and rear frame sections, brackets upon said frame sections, and a leaf spring rigidly connected with the bracket upon the front frame section and slidably fitted within the bracket upon the rear frame section.

In testimony whereof I affix my signature in presence of two witnesses.

ARTHUR A. BAMFORD.

Witnesses:
C. C. HINES,
BENNETT S. JONES.

Copies of this patent may be obtained for five cents each, by addressing the "Commissioner of Patents, Washington, D. C."